(12) United States Patent
Nascimbeni

(10) Patent No.: US 10,737,432 B2
(45) Date of Patent: Aug. 11, 2020

(54) METHOD FOR FORMING AND FILLING A CONTAINER USING A LIQUID HAVING A SWIRL FLOW

(71) Applicant: DISCMA AG, Zürich (CH)

(72) Inventor: Massimo Nascimbeni, Octeville-Ser-Mer (FR)

(73) Assignee: Discma AG, Zurich (CH)

( * ) Notice: Subject to any disclaimer, the term of this patent is extended or adjusted under 35 U.S.C. 154(b) by 278 days.

(21) Appl. No.: 16/068,499

(22) PCT Filed: Jan. 6, 2017

(86) PCT No.: PCT/EP2017/050273
§ 371 (c)(1),
(2) Date: Jul. 6, 2018

(87) PCT Pub. No.: WO2017/118736
PCT Pub. Date: Jul. 13, 2017

(65) Prior Publication Data
US 2019/0016037 A1 Jan. 17, 2019

(30) Foreign Application Priority Data

Jan. 6, 2016 (EP) .................................... 16150345

(51) Int. Cl.
| | |
|---|---|
| *B29C 49/60* | (2006.01) |
| *B29C 49/12* | (2006.01) |
| *B29C 49/36* | (2006.01) |
| *B29C 49/46* | (2006.01) |
| *B29C 49/58* | (2006.01) |

(Continued)

(52) U.S. Cl.
CPC .............. *B29C 49/60* (2013.01); *B29C 49/12* (2013.01); *B29C 49/36* (2013.01); *B29C 49/46* (2013.01); *B29C 49/58* (2013.01); *B29C 49/06* (2013.01); *B29C 2049/465* (2013.01); *B29C 2049/4664* (2013.01); *B29C 2049/5803* (2013.01);

(Continued)

(58) Field of Classification Search
None
See application file for complete search history.

(56) References Cited

U.S. PATENT DOCUMENTS

2013/0074979 A1* 3/2013 Krulitsch .................. B65B 3/10
141/5

FOREIGN PATENT DOCUMENTS

| DE | 2005136 B1 | 8/1971 |
|---|---|---|
| EP | 2143542 A1 | 1/2010 |

(Continued)

*Primary Examiner* — Nathan T Leong
(74) *Attorney, Agent, or Firm* — Eric J. Sosenko; Jonathan P. O'Brien; Honigman LLP

(57) ABSTRACT

A method for simultaneously forming and filling a container by injecting a pressurized liquid in a preform. The method includes placing the preform in a mold and injecting the pressurized liquid into the preform such that the liquid expands the preform and urges the wall of the preform against the wall of the molding cavity forming the preform into a container and the container is filled with liquid. A swirl imparting element extends in the injection flow and imparts a swirl flow on the pressurized liquid such that the pressurized liquid applies a centrifugal force on the wall of the preform during forming and filling of the preform, thereby promoting a radial expansion of the preform in radial planes substantially perpendicular to the preform axis.

20 Claims, 4 Drawing Sheets

(51) Int. Cl.
B29C 49/06 (2006.01)
B29L 31/00 (2006.01)

(52) U.S. Cl.
CPC ................ *B29C 2049/6009* (2013.01); *B29L 2031/7158* (2013.01)

(56) References Cited

FOREIGN PATENT DOCUMENTS

WO 2014/206978 A1 12/2014
WO WO2014206978 * 12/2014

* cited by examiner

METHOD FOR FORMING AND FILLING A CONTAINER USING A LIQUID HAVING A SWIRL FLOW

TECHNICAL FIELD OF THE INVENTION

The present invention relates to a method for simultaneously forming and filling a container by injecting a pressurized liquid in a preform.

The invention also relates to a forming station for simultaneously forming and filling a container by injecting a pressurized liquid in a preform according to such a method In the application, "liquid" has a physical meaning. It designates any incompressible and able to flow medium. The liquid can have a low viscosity (like water or alcohol), a medium viscosity (like edible oil or soup), or a high viscosity (liquid detergent, soap, shampoo, ketchup, mustard). The liquid can be homogeneous or not homogeneous (including fruit pulp or bits of foodstuff), it can be Newtonian or non-Newtonian. It is not limited to foodstuff. The incompressible liquid may be for example water, or other beverages, foodstuff such as ketchup, mayonnaise, edible oil, yogurts, home or personal care products, medical fluids, fuels, hydraulic oil, operating fluids, and the like.

BACKGROUND

In the field known as "hydroforming", it is known to use a pressurized liquid injected inside a preform placed in a mold to shape a container according to the shape of the mold and fill said shaped container with the liquid at the same time. Advantageously, the injected liquid is the end product contained in the container, i.e. the product which is intended to be provided to a consumer using the container.

For allowing the deformation of the preform into a container, the preform is heated at a temperature greater than the glass transition temperature and lower than the crystallization temperature of the material of the preform such that the preform is placed in a malleable state and is able to expand up to the shape of the container to be produced.

In some application, the liquid injected in the preform is generally injected at a temperature lower than the glass transition temperature of the preform material. The temperature of the injected liquid is for example the ambient temperature, typically from 5° C. up to 50° C. while the glass transition temperature is for example over 75° C. for PET.

The preform is expanded in an axial direction, i.e. along the axis of the preform, and in radial planes, i.e. perpendicularly to the axial direction, according to a bi-orientation ratio, or stretch ratio, which is defined by the following equation:

$$BOR = \frac{D}{d} \times \frac{L}{l}$$

Wherein BOR is the bi-orientation ratio, D is the mean diameter of the container to be produced, d is the mean diameter of the preform, L is the half developed length of the container to be produced and l is the half developed length of the preform.

In order to obtain a container having good mechanical and gas/liquid barrier properties and presenting a satisfactory shape, the bi-orientation ratio has to be optimized.

In a hydroforming process, the axial expansion of the preform can be assisted by a stretch rod arranged to elongate the preform along its axis, but the radial expansion is promoted only by the injected liquid and can be insufficient in some areas in the preform. The liquid is generally injected in the direction of the preform axis, generally a vertical axis, and reaches the bottom of the preform first. Consequently, the bottom part of the preform is first expanded and the expansion of the preform occurs from bottom to top the container. Since during the liquid injection, the expanding preform cools down, the upper part of the container can be insufficiently expanded at the end of the liquid injection.

In this case, the bi-orientation ratio is not optimized and the shape of the produced container is not satisfactory.

One of the aims of the invention is to improve the radial expansion of the preform in order to optimize the bi-orientation ratio and ensure a better forming of the container.

Far from the above problem of forming performance, document US 2013/0074979 describes an apparatus for filling bottles. The apparatus comprises a liquid valve, a swirl body and a probe determining the fill level of liquid inside the bottle during filling. The swirl body imparts a swirl such that the liquid filling material flows along the inner surface of the container, avoiding a premature wetting of the probe by the liquid filling material before the desired fill level is reached.

SUMMARY OF THE INVENTION

To this end, the invention relates to a method for simultaneously forming and filling a container by injecting a pressurized liquid in a preform extending according to a preform axis, using a forming station comprising an injection nozzle and a source of pressurized liquid arranged to inject a pressurized liquid through an outlet of the injection nozzle, the method comprising the steps of:
  placing the preform in a mold having a molding cavity defining the shape of the container to be produced,
  placing the preform in liquid tight contact with the outlet of the injection nozzle,
  injecting the pressurized liquid from the pressurized liquid source into the preform through the outlet of the injection nozzle, the pressurized liquid flowing from the pressurized liquid source to the outlet along an injection flow, the liquid expanding the preform and urging the wall of said preform against the wall of the molding cavity such that the preform is formed into a container and said container is filled with liquid, and
  a swirl imparting element of the injection nozzle extending in the injection flow imparts a swirl flow on the pressurized liquid between the pressurized liquid source and the outlet such that the pressurized liquid applies a centrifugal force on the wall of the preform during forming and filling of the preform, thereby promoting a radial expansion of the preform in radial planes substantially perpendicular to the preform axis.

The inventor has discovered that placing a swirl imparting element within an injection nozzle of a forming station for simultaneously forming and filling a container with pressurized liquid produces a very surprising effect that was totally unexpected.

The apparatus for filling a bottle as described in US 2013/0074979 is a traditional filler wherein the liquid drops smoothly inside a bottle already formed while said bottle is full of air or gas. There is no, or almost no difference between the liquid pressure in the nozzle and the inner pressure in the container. The injection speed is therefore very low. The filling time can be for example comprised between 5 s and 20 s. The swirl body inserted in the injection nozzle of the traditional filler only deviates radially the liquid flow as to avoid wetting the probe too early. The swirl created by the swirl body only exists at the nozzle outlet. The injected liquid first reaches the vertical wall of the bottle and then slides down to the bottom of the bottle. The travel of the liquid along the vertical wall reduces or stops the swirl effect. Consequently, the liquid at the bottom of the bottle is almost quiet and stable. During the filling, the liquid level goes up smoothly up to its detection by the probe. This traditional filler with swirl body can generally be used for filling beer or carbonated beverages in order to separate the entry flow of that beverage and the exit flow of air or gas.

In a forming and filling station, the injection speed is very high. The forming and filling time could be 0.2 s because the container has to be formed before the preform temperature drops below the glass transition temperature of the preform material. Additionally, the inner volume of the preform is much smaller than the container inner volume, so the preform is filled with liquid almost immediately after the beginning of the filling. The surprising effect discovered by the inventor is that during the radial expansion of the preform up to the molding cavity, the whole volume of liquid inside the preform is dragged in rotation about the preform axis by the swirl generated at the injection nozzle outlet. Therefore, the rotating whole mass of liquid inside the preform creates a significant centrifugal force on the vertical wall of the preform. In the previously mentioned traditional filler, there is no, or almost no mass in rotation and very small injection speed, so there is no centrifugal force.

In the method of the invention, the existence of said centrifugal forces creates a very interesting technical effect. The centrifugal forces are applied in planes substantially perpendicular to the preform axis, i.e. in radial planes. Therefore, the radial expansion of the preform is not only due to an increase of liquid volume in the preform, like in a bubble expansion. The proportion of the radial expansion with respect to the axial expansion is modified due to the existence of a massive liquid rotation. Consequently, the shape of the obtained container is more satisfactory and the bi-orientation ratio is optimized. Furthermore, the injected liquid first hits the preform in a more even manner and not only at the bottom of the preform. Consequently, the expansion of the preform does not occur from bottom to top and the expansion of the upper part of the preform is improved since said expansion can occur before the material of the preform has cooled down.

According to other features of the method according to the invention:
  the preform is further expanded according to an axial direction extending along the preform axis, said axial expansion being promoted at least in part by a stretch rod of the injection nozzle, said stretch rod extending along the preform axis and being actuated to stretch the preform along said axis,
  the outlet extends along an injection axis substantially aligned with the preform axis, the swirl flow imparted on the pressurized liquid being arranged such that the pressurized liquid swirls around the injection axis according to a swirling slope,
  the swirling slope forms an angle comprised between 40° and 60° with the injection axis, and
  the swirl flow is imparted on the pressurized liquid in the immediate vicinity of the outlet such that the liquid is swirling when it fills the preform.

Imparting the swirling flow close to the outlet allows making sure that the liquid will swirl inside the preform. Furthermore, since the outlet extends according to the injection axis, imparting the swirling flow close to said outlet allows precisely controlling the swirl around the injection axis, which would not necessarily be the case if the swirling flow was imparted in an area where the liquid does not flow in a direction parallel to the injection axis.

According to another feature of the method according to the invention, the swirl flow is arranged such that the radial expansion of the preform occurs substantially simultaneously along a major part of the height of the preform, measured according to the preform axis.

As explained previously, the method according to the invention allows forming the container in a more even manner which improves the final shape of the obtained container.

The invention also relates to a forming station for simultaneously forming and filling a container by injecting a pressurized liquid in a preform extending according to a preform axis, said forming station comprising a pressurized liquid source, a mold having a molding cavity and an injection nozzle comprising an outlet extending along an injection axis, said outlet being arranged to be placed in liquid tight contact with the preform, the forming station being arranged to inject a pressurized liquid from the pressurized liquid source into the preform through the outlet, the pressurized liquid moving from the pressurized liquid source to the outlet along an injection flow, wherein the injection nozzle further comprises a swirl imparting element extending in the injection flow, said swirl imparting element being arranged to impart a swirl flow to the pressurized liquid such that the pressurized liquid swirls around the preform axis when said pressurized liquid flows through the outlet.

The forming station according to the invention allows implementing the method described above.

According to other features of the forming station according to the invention:
  the swirl imparting element is placed in the vicinity of the outlet,
  the injection nozzle comprises a closing valve and a valve seat, said valve seat extending in the vicinity of the outlet, said closing valve being movable between a closed position wherein the closing valve is applied in a liquid tight manner against the valve seat to prevent the pressurized liquid from flowing through the outlet and an opened position wherein the closing valve is spaced from the valve seat to allow liquid to flow through the outlet,
  the closing valve comprises a control rod extending along the injection axis in the injection flow, said control rod comprising a sealing part, placed in liquid tight contact with the valve seat in the closed position of the closing valve, the swirl imparting element comprising a plurality of fins extending around the control rod across at least a part of the injection flow, said fins being oriented along a swirling slope forming an angle relative to the injection axis, and
  the injection nozzle comprises a nozzle body defining the outlet and a nozzle chamber extending upstream of said outlet for temporarily receiving the pressurized liquid to be injected in the preform, the control rod extending and being movable inside said nozzle chamber, the fins extending from the nozzle body towards the control rod or from the control rod towards the nozzle body.

According to an embodiment, the swirl imparting element is attached to the closing valve and extends towards the wall of the nozzle body and according to another embodiment the swirl imparting element is attached to the wall of the nozzle body and extends towards the closing valve.

According to another feature of the forming station according to the invention, the cross-section in a radial plane of each fin extends from the control rod to the nozzle body or extend over only a part of the distance separating the control rod and the nozzle body.

According to an embodiment, the fins extend across the whole distance separating the closing valve from the wall of the nozzle body and, according to another embodiment, across a part of this distance only. In the first case, the swirling flow is imparted on the whole liquid flowing in the nozzle body. In the second case, the swirl imparting element offers less resistance to the flow of liquid, which is advantageous in case of more viscous liquids.

According to another feature of the forming station according to the invention, the swirl imparting element extends upstream or downstream of the sealing part of the control rod.

Placing the swirl imparting element upstream of the sealing part allows imparting the swirling flow at a location where the radial dimension of the inner body is larger. In this case, when the liquid flows into the preform, the liquid moves to a location having a smaller radial dimension, which causes the rotation of the liquid to accelerate when it enters the preform. Consequently, the centrifugal force imparted by the liquid can be increased. Placing the swirl imparting element downstream of the sealing part can be advantageous in terms of space requirement and of access to the swirl imparting device.

According to other features of the forming station according to the invention:
- each fin comprises an upstream end and a downstream end, the tangent of the upstream end being substantially parallel to the injection axis and the tangent of the downstream end extending along the swirling slope, the fin being arcuate between the upstream end and the downstream end, and
- two successive fins form an angle with the injection axis substantially comprised between 24° and 72°.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the terms "upper" and "lower" are defined relative to axis A, which corresponds to the axis of the container to be produced and which extends substantially vertically when the container is placed on its bottom.

In the application, the terms "upstream" and "downstream" are defined with respect to the direction of the flow of liquid circulating in the forming station.

The invention relates to the technical field of forming containers, such as bottles, for example beverage bottles containing water, carbonated water, carbonated soft drinks, Juices, Teas, energy drinks, alcoholic, non-alcoholic drinks or other type of liquids, such as personal or home care products, pharmaceutical, viscous food and non-food products such as for example and not limited to edible oil, ketchup, yogurt, motor oil.

More specifically, the invention relates to a method for producing a container from a preform 2 in a forming machine comprising at least a forming station 4.

The machine is arranged to receive successive preforms 2, each made of a thermoplastic material. The thermoplastic material is for example chosen among the polyesters, such as polyethylene terephthalate (PET), polyethylene naphthalene (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), or other polymers, such as polyvinyl chloride (PVC) or a mix of these materials.

Figure 1:
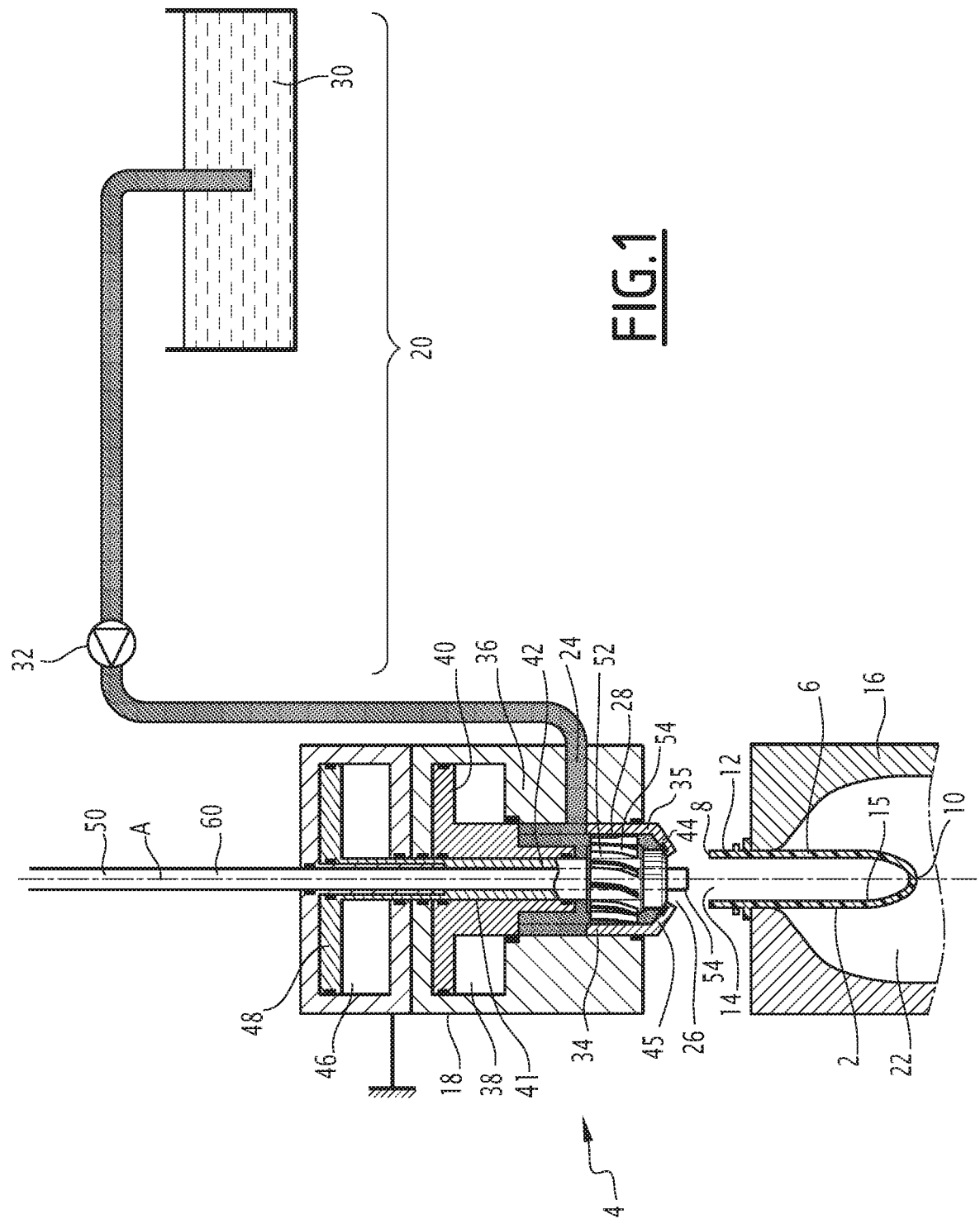
FIG. 1 is a partial cross-section view on a forming station according to an embodiment of the invention.

Each preform 2 has for example the general shape of a test tube. Consequently, each preform 2 comprises a body 6 having the shape of a tube extending along a longitudinal axis, or preform axis, A and having a U shape in longitudinal cross-section, i.e. in an axial plane containing the preform axis A, as shown in FIG. 1. The preforms 2 have an open extreme part 8 and, at the other end, a closed extreme part 10. The open extreme part 8 has for example the final shape of the neck 12 of the container to be shaped, meaning that the shape of the neck 12 will not be modified during the container forming process. The neck 12 defines an inner opening 14 extending along the longitudinal axis A and delimited by a wall with an external face for example provided with a thread allowing the container 1 to receive a cap by screwing. The closed extreme part 10 has for example a hemispherical shape. The above described shape is given as a non-restricting example and other shapes can be foreseen, for example another shape of the neck, without a thread, comprising or not an outer shoulder extending radially substantially perpendicular to the longitudinal axis A. The inner volume of the preform 2 is delimited by an inner wall 15 of the preform.

The preforms 2 can be produced at another location than the location of the forming machine, such that the preforms are stored and shipped together to the location of the machine.

The preforms are then successively loaded in the machine and transferred to a heating station. The heating station is conventional and will not be described in detail herein. The heating station is arranged to heat each of the successive preforms at a temperature comprised between the glass transition temperature and the crystallisation material of the thermoplastic material of the preform 2 such that the preforms 2 are placed in a malleable state in which they are able to be deformed under the influence of a pressure injected inside said heated preforms 2. Alternatively, the preforms 2 can be produced at the same location than the location of the forming machine such that the injected preforms are transferred to the inlet of the forming machine. This allows reducing the energy required for heating the preforms before the forming step.

Each heated preform 2 is then transferred, for example by means of a transfer wheel, to a forming station 4.

The forming station 4 is for example carried by a forming wheel rotating around a first axis substantially parallel to the longitudinal axis A. The forming and filling step, which will be described subsequently, can then be carried out during the rotation of the forming station 4, which allows forming and filling several preforms 2 at the same time by providing several forming stations 4 on the wheel.

Figure 2:
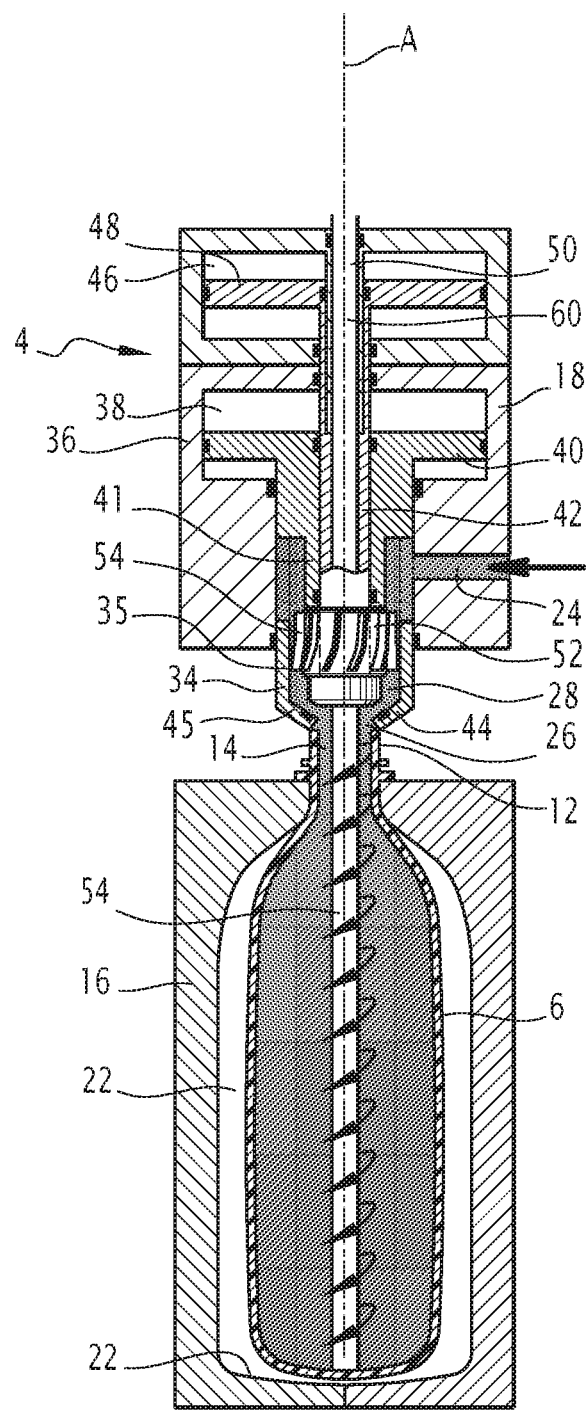
FIG. 2 is a partial cross-section view of part of the forming station of FIG. 1, the closing valve being in an opened position.

Each forming station 4 comprises a mold 16 arranged to receive a preform 2 and an injection nozzle 18 arranged to inject a forming liquid in the preform 2 received by the mold 16, as shown in FIGS. 1 and 2. The forming liquid is a pressurized liquid coming from a pressurized liquid source 20.

Apart from the swirl imparting element, which will be described subsequently, such a forming station 4 is conventional for a hydroforming machine.

The mold 16 defines a molding cavity 22 having the shape of the container 1 to be produced. The mold 16 comprises for example at least two parts movable relative to each other, between an opened position and a closed position. The two parts are for example hinged together and are movable in rotation relative to each other around an axis substantially parallel to the preform axis A. Each part of the mold 16 comprises a body comprising a hollow recess having the shape of a half bottle to be formed. According to a non-limiting example, the hollow recess of one part comprises a semi-cylindrical portion, closed at its lower end by a bottom surface having a shape of a semi-circle, and terminated at its upper end by a tapered, then semi-cylindrical collar of a shape substantially complementary to the shape of half of the body 6 of the preform 2. The hollow recess of the other part of the mould is symmetrical to the hollow recess described above. In the opened position, the parts of the mould are separated from each other such that the preform 2 can be introduced between the two parts. In the closed position, the two parts are applied against each other to form a main part, such that the hollow recesses face each other and define together the molding cavity 22 having the shape of the container to be formed. The mold 16 could comprise more than two parts. For example a third part having the shape of the bottom of the container could be provided to define the molding cavity 22 with two parts having the shape of the body of the container. The third part or the two bottom surfaces of the two parts of the mold 16 define the bottom of the mold 16.

The injection nozzle 18 for injecting the pressurized incompressible liquid in the preform 2 will now be described.

The injection nozzle 18 comprises an inlet 24, an outlet 26 and a nozzle chamber 28 extending between the inlet 24 and the outlet 26 and placing the inlet 24 in fluidic communication with the outlet 26.

The inlet 24 is placed in fluidic communication with the pressurized liquid source 2, which comprises an incompressible forming liquid source 30, for example a water reservoir, pressurizing means 32 adapted for pressurizing and transferring the liquid from the liquid source 30 to the inlet 24 at least one controllable predetermined pressure and appropriate tubing extending between the inlet 24, the pressurizing means 32 and the liquid source 30. According to the embodiment shown in FIG. 1, the pressurizing means 32 are formed by a pump. Alternatively, the injection means can also be formed by a conventional piston or by other appropriate means allowing controlling the pressure of the liquid injected in the preform. According to an embodiment, the pressure applied by the injection means is variable such that the liquid can be injected at different pressures in the preform 2. By pressurizing, it is meant that the pressure in the liquid is brought to a pressure greater than the atmospheric pressure.

The outlet 26 is adapted to be placed in liquid tight fluidic communication with the opening 14 formed by the neck 12 of the preform 2 held by the mold 16 of the forming and filling station, and therefore with the inner volume of the preform 2. By liquid tight fluidic communication, it is meant that when the outlet 26 is in fluidic communication with the inner volume of the preform 2, the liquid flows only in the inner volume of the preform 2 and not outside the preform 2.

The outlet 26 is for example formed by an opening of a nozzle body 34, which comprises a wall defining the nozzle chamber 28. The outlet 26 is in fluidic communication with the nozzle chamber 28. The outlet 26 and the nozzle chamber 28 extend along an injection axis, which is substantially aligned with the preform axis A when the preform 2 is placed in the mold 16, as shown in FIG. 1.

According to the embodiment shown in FIGS. 1 and 2, the nozzle body 34 comprises a movable part 35 movable inside a housing 36 of the nozzle body, in translation along injection axis A between a retracted position (FIG. 1) and an active position (FIG. 2). In the retracted position, the movable part 35 leaves room under the injection nozzle 18 to position a preform 2 in the mold 16 or to retrieve a formed container 1 from the mold 16. In the active position, the movable part 35 placed against the neck 12 of the preform 2 with a liquid tight contact between the nozzle body 34 and the neck 12 of the preform 2, such that the outlet 26 is in fluidic communication with the inner volume of the preform 2. The nozzle chamber 28 of the nozzle body 34 for example comprises a hollow space including a regular cylindrical portion and a truncated cone or a pyramidal portion extending between the regular cylindrical portion and the outlet 26 of the injection nozzle. The diameter of the nozzle chamber 28 reduces progressively from the diameter of the regular cylindrical portion to the diameter of the opening in the conical portion.

According to the embodiment shown in the figures, the housing 36 further comprises a first upper compartment 38 arranged to receive actuation means 40 for moving the movable part 35. The actuation means are for example pneumatic actuation means and for example comprise a piston, attached to the movable part 35 and hermetically separating the first upper compartment 38 into an upper part and into a lower part, each able to be filled with air. For moving the movable part between its retracted position and its active position, air is injected in the upper part of the first upper compartment 38 in order to increase the pressure in said upper part and to move the piston such that the volume of the upper part increases, while the volume of the lower part decreases. Conversely, for moving the movable part 35 between its active position and its retracted position, air is injected in the lower part of the first upper compartment 38 in order to increase the pressure in said lower part and to move the piston such that the volume of the lower part increases, while the volume of the upper part decreases. The inner volume of the nozzle chamber 28 is hermetically isolated from the first upper compartment 38 by appropriate sealing means.

The injection nozzle 18 further comprises a closing valve 41 for example formed by a hollow control rod 42 extending in the nozzle chamber 28 along axis A. The hollow control rod 42 comprises at its lower end, extending in the nozzle chamber 28, a sealing part 44, for example formed by a sealing ring. The sealing part 44 has a shape which is complementary to the shape of part of the conical portion of the nozzle body 34, such that, when the sealing part 44 is applied against the wall of the conical portion, the sealing part 44 closes hermetically the nozzle chamber 28 and prevents liquid from flowing through the outlet 26. The conical portion therefore forms a valve seat 45 arranged for receiving the sealing part 44 in a liquid tight manner. The valve seat 45 extends in the immediate vicinity of the outlet 26. The valve seat 45 for example extends from the outlet 26 towards the cylindrical portion of nozzle body 34.

The control rod 42 is movable in translation along injection axis A in the nozzle chamber 28 between an injecting position, shown in FIG. 2, wherein the sealing part 44 is spaced from the valve seat 45 and wherein the outlet 26 is in fluidic communication with the inlet 24 via the nozzle chamber 28, and a sealing position, shown in FIG. 1, wherein the sealing part 44 is applied against the wall of the valve seat and hermetically closes the nozzle chamber 28.

The housing 36 further comprises a second upper compartment 46 arranged to receive actuation means 48 for moving the control rod 42. The actuation means are for example pneumatic actuation means and for example comprise a piston, attached to the control rod 42 and hermetically separating the second upper compartment 46 into an upper part and into a lower part, each able to be filled with air. For moving the control rod 42 between its injecting position and its sealing position, air is injected in the upper part of the second upper compartment 46 in order to increase the pressure in said upper part and to move the piston such that the volume of the upper part increases, while the volume of the lower part decreases. Conversely, for moving the control rod 42 between its sealing position and its injecting position, air is injected in the lower part of the second upper compartment 46 in order to increase the pressure in said lower part and to move the piston such that the volume of the lower part increases, while the volume of the upper part decreases. The first upper compartment 38 is hermetically isolated from the second upper compartment 46 by appropriate sealing means.

According to the embodiment shown in the figures, a stretch rod 50 extends inside the hollow control rod 42, passes through the outlet 26 and extends in the preform 2 to assist in the axial deformation of the preform 2 into a container, as will be described subsequently. The stretch rod 50 is movable in translation along axis A in the hollow control rod 42 and is actuated by appropriate actuation means, for example a servo motor or a magnetic actuation means. The stretch rod 50 is movable in a fluid tight manner through the sealing part 44 thanks to appropriate sealing means extending between the hollow control rod 42 and the stretch rod 50.

As will be described subsequently in greater detail, the liquid flowing from the liquid source 30 to the outlet 26 flows according to an injection flow.

The forming station 4 according to the invention further comprises a swirl imparting element 52 extending in the injection nozzle 18 between the pressurized liquid source 20 and the outlet 26 and arranged to impart a particular flow on the pressurized liquid, said particular flow being modified relative to the injection axis A, as will be described subsequently. More particularly, the swirl imparting element 52 is preferably placed in a part of the injection nozzle 18 which extends along the injection axis A.

In this case, the swirl imparting element 52 comprises a plurality of fins 54 extending around the injection axis A.

Figure 4:
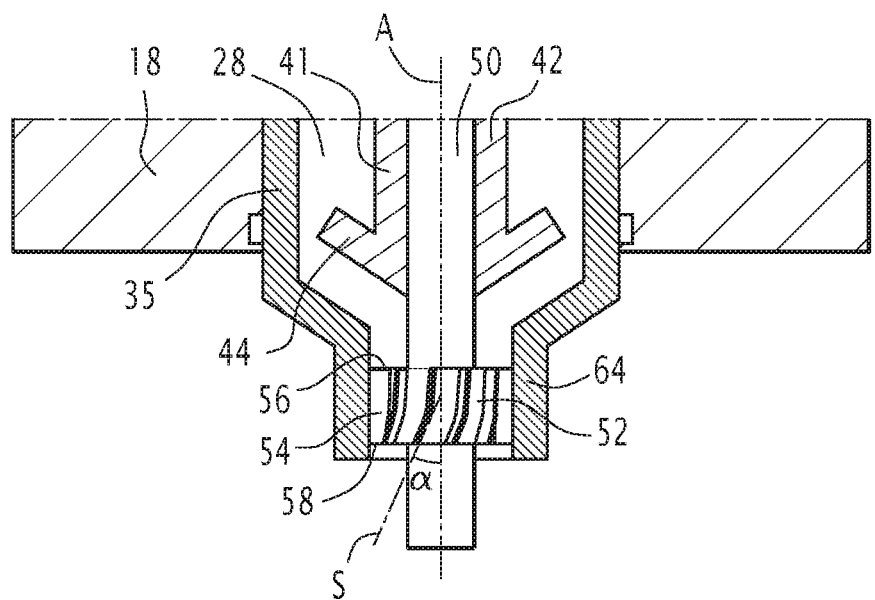
FIG. 4 is a partial cross-section view of part of an injection nozzle according to another embodiment of the forming station of the invention.

Each fin 54 extends between an upstream end 56 and a downstream end 58, the upstream end 56 extending upstream of the downstream end 58 relative to the injection flow. The upstream end 56 extends substantially along the injection axis A, meaning that the tangent of the fin 54 at the upstream end is substantially parallel to the injection axis. The downstream end 58 extends along a swirling slope S, meaning that the tangent of the fin 54 at the downstream end extends along a slope S that forms an non-zero angle α with the injection axis A, as shown in FIG. 4. According to various embodiments, angle α is for example comprised between 40° and 60°. Between the upstream end 56 and the downstream end 58, the fin 54 has an arcuate shape. The arcuate shape is for example such that the tangents to the fins change progressively from being parallel to the injection axis A at the upstream end 56 to extending along the swirling slope S at the downstream end 58.

Figure 5:
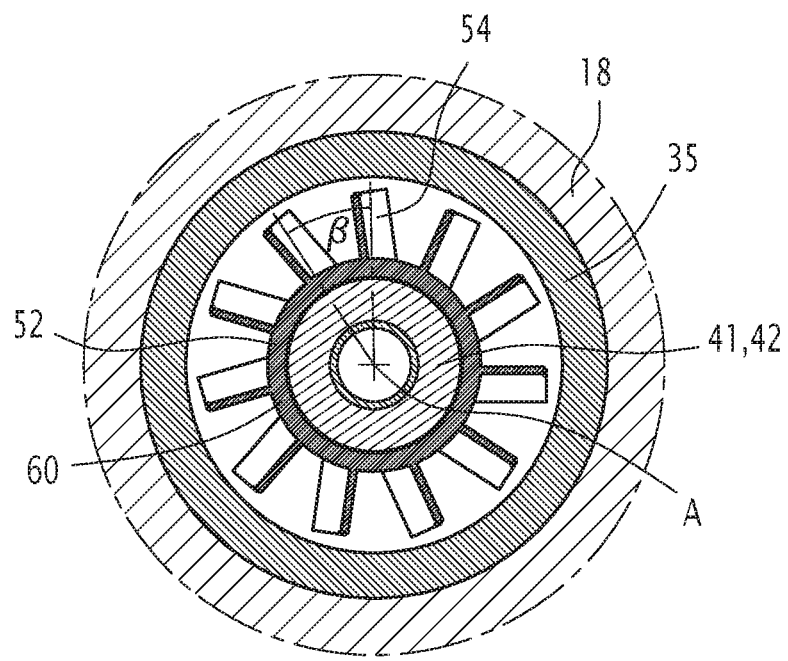
FIGS. 5 and 6 are partial cross-section views in a radial plane of an injection nozzle according to different embodiments of the forming station of the invention.
Figure 6:
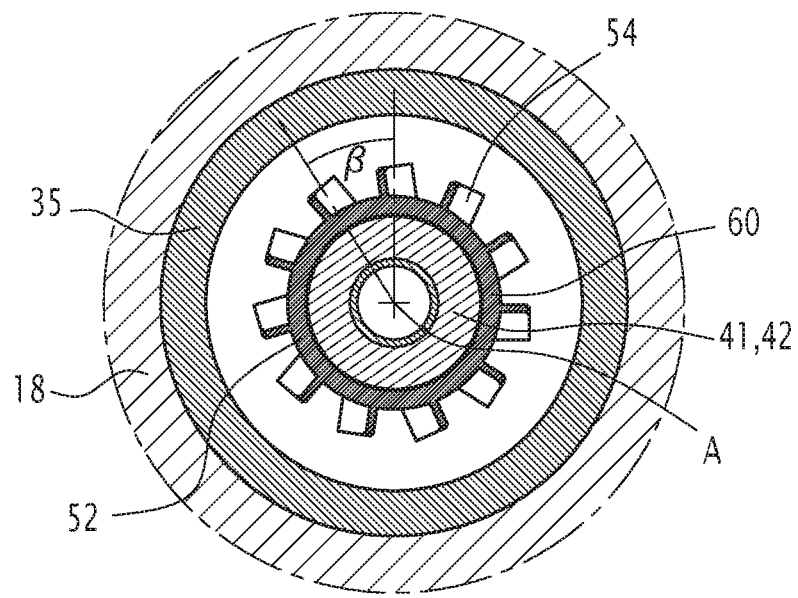

The fins 54 are for example arranged regularly around the injection axis A, meaning that the angle β between two successive fins 54 and the injection axis A is constant and that the fins 54 are regularly distributed around axis A, as shown in FIGS. 5 and 6. Angle β is for example comprised between 24° and 72°. In particular, angle β is for example equal to 36° when the swirl imparting element comprises 12 fins.

Figure 3:
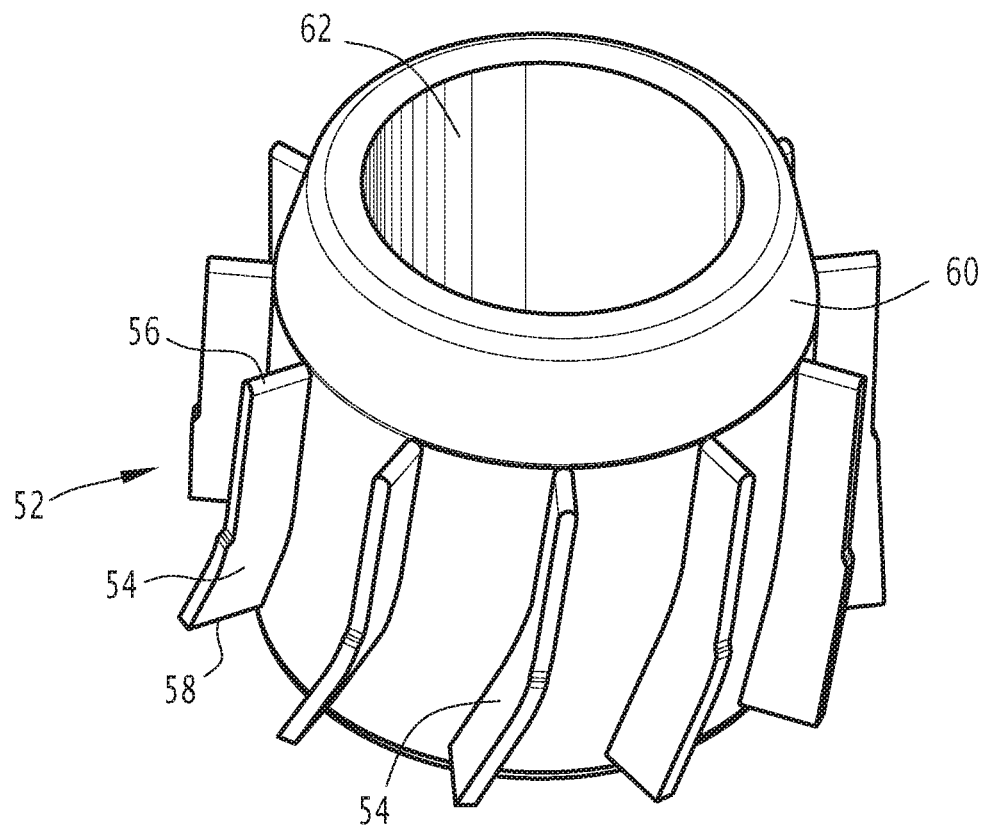
FIG. 3 is a perspective view of a swirl imparting element that can be used in the forming station according to the invention.

According to a first embodiment, shown in FIGS. 1 to 3, the swirl imparting element 52 is attached to the control rod 42 such that the fins 54 extend from the control rod 42 toward the nozzle body 34. In this case, the swirl imparting element 52 is movable with the control rod 42. The swirl imparting element 52 has for example the shape shown in FIG. 3 and comprises a body 60 carrying the fins 54 and comprising a central bore 62 arranged to be placed around the control rod 42. In this case, the swirl imparting element 52 can be changed if needed, for example to modify the swirling slope S. According to another embodiment, the fins 54 are made unitary with the control rod 42, the swirl imparting element being formed by the control rod 42 itself.

According to a second embodiment (not illustrated), the swirl imparting element 52 is attached to the nozzle body 34 such that the fins 54 extend from the nozzle body 34 toward the control rod 42. In this case, the fins 54 are for example made unitary with the nozzle body 34 and the control rod 42 is movable relative to the fins.

In all the above embodiments, the swirl imparting element 52 extends preferably in the vicinity of the outlet 26, as close as possible to said outlet 26.

According to an embodiment, the swirl imparting element 52 extends upstream of the sealing part 44 of the control rod 42. In this case, the swirl imparting element 52 extends in the nozzle chamber 28, for example in the regular cylindrical portion of said chamber. In this case, the swirl imparting element 52 extends in a part having a radial dimension, i.e. a diameter in the case of a circular cross-section of the nozzle chamber 28, larger than the radial dimension of the outlet 26.

According to another embodiment, the swirl imparting element 52 extends downstream of the sealing part 44 of the control rod 42. In this case, the swirl imparting element is placed in a tubular portion 64 forming the outlet 26 and extending downstream of the valve seat 45. In this case, the swirl imparting element 52 extends in a part having a radial dimension which is substantially equal to the radial dimension of the outlet 26 and is in the immediate vicinity of the outlet 26. In the case where the swirl imparting element 52 is attached to the control rod 42, the control rod 42 can comprise a part extending downstream of the sealing part 44 in the tubular portion 64.

According to a particular embodiment shown in FIG. 5, the fins 54 have a radial dimension, i.e. a cross-section in a radial plane, substantially equal to the radial distance separating the control rod 42 from the wall of the nozzle chamber 28 or from the wall of the central bore 62. In this case, the fins 54 extend radially across the whole injection flow.

According to another embodiment shown in FIG. 6, the fins 54 have a radial dimension which is inferior to the radial distance separating the control rod 42 from the wall of the nozzle chamber 28 or from the wall of the central bore 62. In this case, the fins extend radially across a part of the injection flow only.

In a variant, the radial dimension of the fins is variable between the upstream end 56 and the downstream end 58 such that the fins extend radially more or less across the injection flow.

The above described embodiments can be applied in combination with the previous described embodiments, i.e. when the fins are attached to the control rod 42 or when they are attached to the nozzle body 34 and/or when the swirl imparting element 52 extends upstream or downstream of the sealing part 44.

Apart from the swirl imparting element 52, the forming station 4 described above is only a non-limitative example and modifications could be brought. For example, the injection could not comprise a stretch rod 50 or a movable part 35 and/or the actuation means could be different from the ones described above.

The method for simultaneous simultaneously forming and filling a container from the preform 2 using a forming station described above will now be described.

A heated preform 2 is placed in the mold 16, which is then closed. By heated, it is meant that the preform 2 is in a malleable state. If such a malleable state can be achieved without heating the preform 2, then such a heating is not required.

The outlet 26 of the injection nozzle 18 is then placed in fluidic communication with the inner opening 14 of the preform 2 for example by moving the movable part 35 to place it in fluid tight contact with the neck 12 of the preform 2.

During this step, the closing valve 41 is in closed position such that liquid cannot flow through the outlet 26. The pressurized liquid source 20 is arranged to fill the nozzle chamber 28 with pressurized liquid such that when the closing valve 41 is moved in opened position by moving the sealing part 44 away from the valve seat 45 pressurized liquid flows into the preform 2 through the outlet 26.

When the forming station 4 comprises a stretch rod 50, the method comprises a step of axial stretching of the preform 2 using the stretch rod 50. This step can occur prior moving the closing valve 41 in the opened position or at the same time. The stretch rod 50 is moved in translation along the preform axis A until it contacts the closed extreme part 10 of the preform 2 and then moved further such that the preform is expanded, or stretched, in the preform axis direction until it contacts the bottom of the molding cavity 22.

During this step or once this step is completed, the closing valve 41 is opened such that pressurized liquid is injected in the preform through the outlet 26. The liquid flows into the preform thanks to the difference of pressure between the nozzle chamber 28, which contains pressurized liquid at a pressure greater than the atmospheric pressure, and the inner volume of the preform, which is, before the closing valve 41 is opened, at atmospheric pressure. Since the preform 2 and the injection nozzle 18 are in liquid tight contact, the pressure difference which is established when the closing valve 41 is opened causes the liquid to flow into the preform 2.

When flowing towards the outlet 26, the pressurized liquid flows through the fins 54 of the swirl imparting element 52, which therefore modifies the flow of liquid thanks to the swirling slope S of the fins 54. Before flowing through the swirl imparting element 52, the liquid flows in the nozzle chamber 28 along the injection axis A. The swirl imparting element 52 further causes the liquid to rotate around the injection axis A, as shown by arrows of FIG. 2. Consequently, the liquid adopts a swirl flow comprising a movement along the injection axis and a rotation around the injection axis A. The pressurized liquid therefore gains a centrifugal force due to the rotation around the injection axis A. The swirl imparting element 52 is arranged to make sure that the liquid is swirling around the injection axis A when it fills the preform.

Consequently, when the pressurized liquid enters the inner volume of the preform 2, it imparts a centrifugal force against the wall 15 of the preform 2 which causes the preform 2 to expand in radial planes as well as in the axial direction. The greater the centrifugal force of the liquid is, the greater the radial expansion of the preform 2 is. The centrifugal force can be adjusted by modifying the swirling slope S, i.e. by adjusting angle α and depends on the viscosity and pressure of the injected liquid. Consequently, angle α can be chosen depending on the pressurized liquid to be injected to have a sufficient centrifugal force while ensuring a proper flow of the liquid in the preform 2. Similarly, the choice of having fins 54 which extend across the whole injection flow and across a part of it only is made depending on the liquid to be injected, as explained previously.

The preform during this forming and filling step therefore expands both in the axial direction and in radial planes as shown in FIG. 2 until the wall 15 contacts the wall of the molding cavity and is pressed against it Thanks to the centrifugal force applied by the liquid, the preform is evenly applied against the wall of the molding cavity and the details to be imparted on the container, such as ridges, ribs, or other details, are well defined.

Consequently, the obtained filled container is well shaped and its bi-orientation ratio is satisfactory.

The container is not formed from bottom to top as it is usually the case in conventional hydroforming methods because the liquid impacts the wall of the preform along a major part of the height of the preform substantially simultaneously thanks to the swirl flow of the liquid. According to an embodiment, the liquid impacts simultaneously the wall of the preform along the whole height of the preform. The height of the preform is defined as the dimension of the preform along the preform axis A.

When the forming and filling of the container is completed, the sealing part 44 is moved against the valve seat 45 to close the closing valve 41 and the formed and filled container is retrieved from the mold 16. The method can then take place again with a new preform 2.

The invention claimed is:

1. A method for simultaneously forming and filling a container by injecting a pressurized liquid in a preform extending according to a preform axis, using a forming station having an injection nozzle and a source of pressurized liquid arranged to inject a pressurized liquid through an outlet of the injection nozzle, the method comprising the steps of:

placing the preform in a mold having a molding cavity defining the shape of the container to be produced, placing the preform in liquid tight contact with the outlet of the injection nozzle, injecting the pressurized liquid from the pressurized liquid source into the preform through the outlet of the injection nozzle, the pressurized liquid flowing from the pressurized liquid source to the outlet along an injection flow, the liquid expanding the preform and urging the wall of the preform against the wall of the molding cavity such that the preform is formed into a container and the container is filled with liquid, wherein a swirl imparting element of the injection nozzle extending in the injection flow imparts a swirl flow on the pressurized liquid between the pressurized liquid source and the outlet such that the pressurized liquid applies a centrifugal force on the wall of the preform during forming and filling of the preform, thereby promoting a radial expansion of the preform in radial planes substantially perpendicular to the preform axis.

2. The method according to claim 1, wherein the preform is further expanded according to an axial direction extending along the preform axis, axial expansion being promoted at least in part by a stretch rod of the injection nozzle, the stretch rod extending along the preform axis and being actuated to stretch the preform along the axis.

3. The method according to claim 1, wherein the outlet extends along an injection axis substantially aligned with the preform axis, the swirl flow imparted on the pressurized liquid being arranged such that the pressurized liquid swirls around the injection axis according to a swirling slope.

4. The method according to claim 3, wherein the swirling slope forms an angle of between 40° and 60° with the injection axis.

5. The method according to claim 1, wherein the swirl flow is imparted on the pressurized liquid in the immediate vicinity of the outlet such that the liquid is swirling during injection into the preform.

6. The method according to claim 1, wherein the swirl flow is arranged such that the radial expansion of the preform occurs substantially simultaneously along a major part of the height of the preform, measured according to the preform axis.

7. A forming station for simultaneously forming and filling a container by injecting a pressurized liquid in a preform extending according to a preform axis, said forming station comprising a pressurized liquid source, a mold having a molding cavity and an injection nozzle having an outlet extending along an injection axis, the outlet being arranged to be placed in liquid tight contact with the preform, the forming station being arranged to inject a pressurized liquid from the pressurized liquid source into the preform through the outlet, the pressurized liquid moving from the pressurized liquid source to the outlet along an injection flow, the injection nozzle further including a swirl imparting element extending in the injection flow, the swirl imparting element being arranged to impart a swirl flow to the pressurized liquid such that the pressurized liquid swirls around the preform axis when the pressurized liquid flows through the outlet.

8. The forming station according to claim 7, wherein the swirl imparting element is located in the vicinity of the outlet.

9. The forming station according to claim 7, wherein the injection nozzle comprises a closing valve and a valve seat, the valve seat extending in the vicinity of the outlet, the closing valve being movable between a closed position wherein the closing valve is applied in a liquid tight manner against the valve seat to prevent the pressurized liquid from flowing through the outlet and an opened position wherein the closing valve is spaced from the valve seat to allow liquid to flow through the outlet.

10. The forming station according to claim 9, wherein the closing valve comprises a control rod extending along the injection axis in the injection flow, said control rod comprising a sealing part placed in liquid tight contact with the valve seat in the closed position of the closing valve.

11. The forming station according to claim 10, wherein the injection nozzle comprises a nozzle body defining the outlet and a nozzle chamber extending upstream of the outlet, the control rod extending and being movable inside said nozzle chamber.

12. The forming station according to claim 10, wherein the swirl imparting element extends upstream or downstream of the sealing part of the control rod.

13. The forming station according to claim 10, wherein each fin comprises an upstream end and a downstream end, the tangent of the upstream end being substantially parallel to the injection axis and the tangent of the downstream end extending along the swirling slope, the fin being arcuate between the upstream end and the downstream end.

14. The forming station according to claim 10, wherein two successive fins form an angle with the injection axis within the range of 24° to 72°.

15. The forming station according to claim 10, wherein the swirl imparting element comprises a plurality of fins extending around the control rod across at least a part of the injection flow, the fins being oriented along a swirling slope forming an angle relative to the injection axis.

16. The forming station according to claim 15, wherein the cross-section in a radial plane of each fin extends from the control rod to the nozzle body.

17. The forming station according to claim 15, wherein the fins extend from the nozzle body towards the control rod.

18. The forming station according to claim 15, wherein the fins extend from the control rod towards the nozzle body.

19. The forming station according to claim 15, wherein the cross-section in a radial plane of each fin extends from the control rod to the nozzle body or extend over only a part of the distance separating the control rod and the nozzle body.

20. The forming station according to claim 15, wherein the cross-section in a radial plane of each fin extends over only a part of the distance separating the control rod and the nozzle body.

* * * * *